US012345940B2

(12) United States Patent
Hill et al.

(10) Patent No.: US 12,345,940 B2
(45) Date of Patent: Jul. 1, 2025

(54) AERIAL OPTICAL FIBER DISTRIBUTION HUB

(71) Applicant: Clearfield, Inc., Minneapolis, MN (US)

(72) Inventors: John P. Hill, Oak Grove, MN (US); Randy T. VanHorn, Princeton, MN (US)

(73) Assignee: Clearfield, Inc., Minneapolis, MN (US)

( * ) Notice: Subject to any disclaimer, the term of this patent is extended or adjusted under 35 U.S.C. 154(b) by 361 days.

(21) Appl. No.: 18/053,615

(22) Filed: Nov. 8, 2022

(65) Prior Publication Data

US 2023/0138143 A1    May 4, 2023

Related U.S. Application Data

(62) Division of application No. 17/142,863, filed on Jan. 6, 2021, now Pat. No. 11,561,355.

(60) Provisional application No. 62/958,096, filed on Jan. 7, 2020.

(51) Int. Cl.
G02B 6/00 (2006.01)
G02B 6/44 (2006.01)

(52) U.S. Cl.
CPC ....... *G02B 6/4471* (2013.01); *G02B 6/44524* (2023.05)

(58) Field of Classification Search
CPC ........ G02B 6/4452; G02B 6/00; G02B 6/445; G02B 6/4446
See application file for complete search history.

(56) References Cited

U.S. PATENT DOCUMENTS

| | | | | |
|---|---|---|---|---|
| 7,489,849 B2* | 2/2009 | Reagan | ............. | G02B 6/44775 385/134 |
| 8,254,740 B2* | 8/2012 | Smith | ...................... | G02B 6/47 385/135 |
| 9,841,569 B2* | 12/2017 | Kmit | ..................... | H04B 10/27 |
| 10,374,746 B1* | 8/2019 | Lawrence | ................. | H04L 5/14 |
| 2011/0211799 A1* | 9/2011 | Conner | ................ | G02B 6/4471 29/428 |

* cited by examiner

*Primary Examiner* — Jennifer Doan
(74) *Attorney, Agent, or Firm* — TROUTMAN PEPPER LOCKE LLP; Alison McCarthy; Mark Lehi Jones

(57) ABSTRACT

A fiber distribution hub comprises a housing, a first side panel and a second side panel comprising one or more ports, and at least one cover disposed between the first side panel and the second side panel and forming an interior compartment. The interior compartment may include cable managers. A mounting structure aerially strand mounts the fiber distribution hub. Fiber distribution hubs comprising a first fiber distribution hub, a second fiber distribution hub configured to couple to the first fiber distribution hub, and a mounting structure configured to aerially strand mount the fiber distribution hub are also disclosed.

20 Claims, 12 Drawing Sheets

AERIAL OPTICAL FIBER DISTRIBUTION HUB

CROSS REFERENCE TO RELATED APPLICATION

This application is a divisional application of U.S. patent application Ser. No. 17/142,863, filed Jan. 6, 2021, and published as U.S. Patent Application Publication No. 2021/0208353 on Jul. 8, 2021. U.S. patent application Ser. No. 17/142,863 claims the benefit of priority under 35 U.S.C. 119(e) to U.S. Provisional Patent Application No. 62/958,096, filed on Jan. 7, 2020, entitled, "Aerial Optical Fiber Distribution Hub," the contents of which are incorporated herein by reference in their entirety.

TECHNICAL FIELD

The present disclosure relates generally to optical fiber distribution systems, and more specifically to fiber distribution hubs (FDH) for optical fiber communication networks.

BACKGROUND

Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber or to provide termination connection ports for end users at which one or more fibers may be branched from a feed cable. In instances when the connection may be exposed to weather conditions, an essentially waterproof configuration of components is needed.

To interconnect the cables, various cable connector designs provide for low insertion loss and stability. Some example connectors may include, but are not limited to, SC, Dual LC, LC, ST and MPO connectors. In most of these designs, ferrules (one in each connector, or one in the connector and one in the apparatus or device), each containing an optical fiber end, are butted together end to end and light travels across the junction.

With the increasing desire for completely optical networks, "fiber to the premises" (FTTP) or "fiber to the home" (FTTH) systems are being developed to provide optical fibers that extend from the source to the site of the end-user. For this purpose, optical fiber distribution hubs (FDH) and connection terminals are needed for interconnection of the feed lines with drop cables that extend to various user locations within a certain distance from the terminals. Further, there is a need for flexible, customizable fiber distribution systems, including fiber distribution hubs that may be easily expanded or reconfigured.

SUMMARY

According to one aspect of the present disclosure, there is provided a fiber distribution hub comprising a housing, a first side panel and a second side panel disposed opposite to the first side panel, wherein the first side panel and the second side panel comprise one or more ports. The fiber distribution hub further comprises a first cover disposed between the first side panel and the second side panel and forming a first interior compartment between the first side panel and the second side panel. The fiber distribution hub further comprises a mounting structure configured to aerially strand mount the fiber distribution hub.

In some embodiments, the fiber distribution hub may further comprise a second cover disposed opposite the first cover between the first side panel and the second side panel, forming a second interior compartment between the first side panel and the second side panel. In some embodiments, the first compartment and the second compartment may be separated by a divider. The first cover and the second cover may be hinged at one side of the housing and configured to latch at the opposite side of the housing. In some embodiments, the mounting structure may comprise a plurality of mounting brackets.

In some embodiments, the one or more ports of the fiber distribution hub may include one or more feeder ports and one or more distribution ports. In some embodiments, the first side panel may comprise one or more feeder ports and the second side panel may comprise one or more distribution ports. In other embodiments, each of the first side panel and the second side panel may comprise one or more feeder ports and one or more distribution ports.

In some embodiments, the first interior compartment may further comprise an adapter plate configured to receive a plurality of adapters. The first interior compartment may further comprise a splitter. The first interior compartment may further comprise a plurality of drop management rings.

The fiber distribution hub may further be configured to couple to an add-on fiber distribution hub. In some embodiments, the add-on fiber distribution hub may be configured similarly to the fiber distribution hub. In other embodiments, the add-on fiber distribution hub may be different from the fiber distribution hub.

In some embodiments, the first interior compartment may further comprise a cable manager. The cable manager may comprise a first cylindrical portion and a second cylindrical portion having a different length from the first cylindrical portion. The cable manager may further comprise a bridge coupling the first and second cylindrical portions. The bridge may extend from a middle portion of the first cylindrical portion to an end of the second cylindrical portion. The cable manager may further comprise a second bridge coupling the first and second cylindrical portions. The second bridge may have a first portion coupled to the first cylindrical portion, a second portion coupled to the second cylindrical portion, and a gap between the first portion and the second portion.

According to another aspect, there is provided a fiber distribution hub comprising a first fiber distribution hub, a second fiber distribution hub configured to couple to the first fiber distribution hub, and a mounting structure configured to aerially strand mount the fiber distribution hub. Each of the first and second fiber distribution hubs may be configured according to aspects disclosed herein.

DETAILED DESCRIPTION

Aspects of the present disclosure provide aerial optical fiber distribution hubs that are flexible and expandable. The aerial fiber distribution hubs may be expanded in the field to accommodate changing needs.

Figure 1:
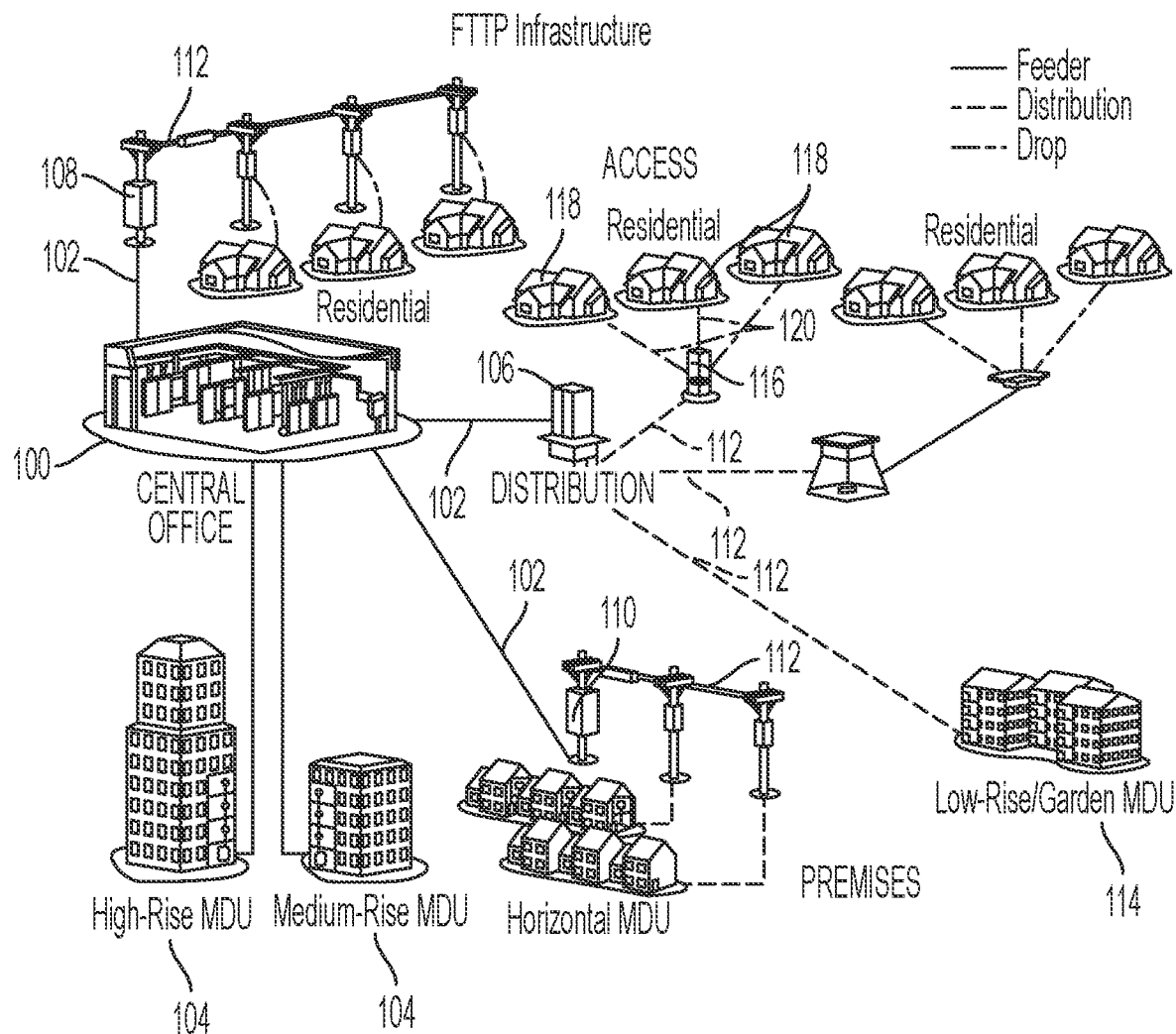
FIG. 1 is a schematic diagram of a fiber to the premises (FTTP) architecture.

FIG. 1 is a schematic diagram of a fiber to the premises (FTTP) architecture. The FTTP architecture includes a central office 100, providing a plurality of feeder cables 102. The feeder cables 102 may extend directly to multi-dwelling units (MDUs), such as MDUs 104. The feeder cables may also be received by fiber distribution hubs, such as fiber distribution hubs 106, 108 and 110. The fiber distribution hubs may provide distribution cables 112 directly to residences or MDUs, such as MDU 114, or to intermediate terminals such as terminals 116 for distribution to end users 118 via drop cables 120. Fiber distribution hubs may be cross-connected and used with splitters. However, such fiber distribution hubs are either pole mounted, vault mounted, or pedestal mounted, depending on size. For example, in FIG. 1, the fiber distribution hub 106 is located on a ground pedestal, and the fiber distribution hubs 108 and 110 are pole mounted.

Figure 2:
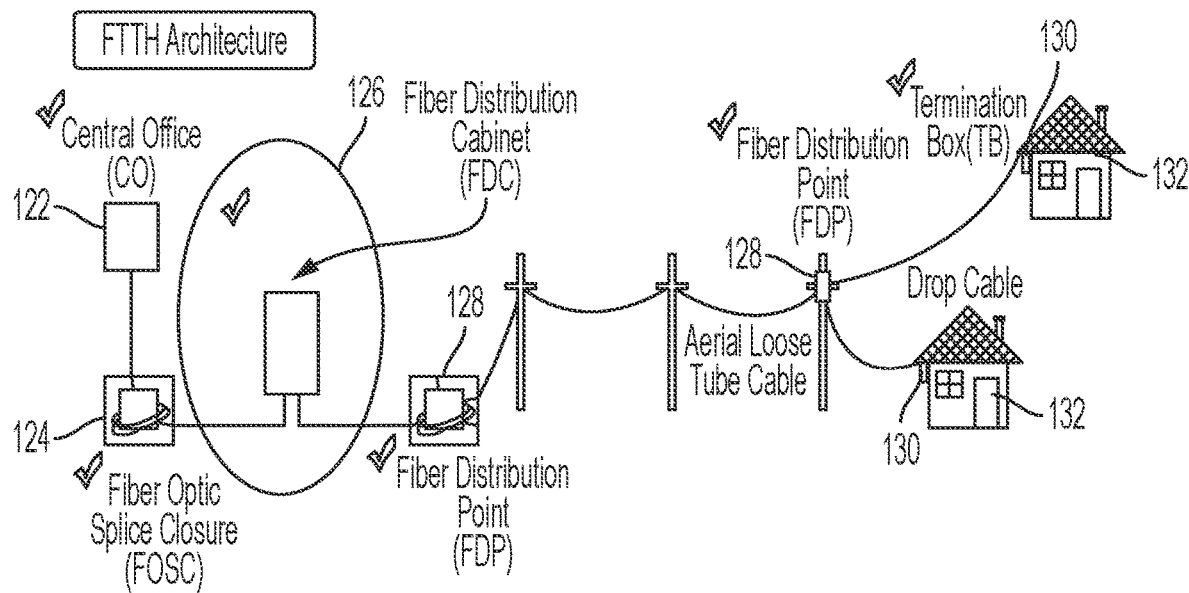
FIG. 2 is a schematic diagram of a fiber to the home (FTTH) architecture.

FIG. 2 is a schematic diagram of a fiber to the home (FTTH) architecture. The FTTH architecture includes a central office 122, a fiber optic splice closure 124, a fiber distribution cabinet (or hub) 126, a plurality of fiber distribution points or terminals 128, and termination boxes 130 located at end user residences 132. While splice cases, terminals and multi-service terminals (MSTs) may be mounted on strands, currently there is no fiber distribution hub with cross-connect capability that may be mounted aerially on a strand.

To support the need for more flexible and reconfigurable fiber distribution systems, embodiments disclosed herein provide flexible and expandable aerial fiber distribution hubs that may be strand mounted and capable of cross-connection. When the network deployment plan calls out for an aerial application, embodiments of the aerial fiber distribution hubs disclosed herein allow for the flexibility to easily configure, reconfigure or expand the distribution hub.

The present disclosure is not limited in terms of the particular embodiments described in this application, which are intended as illustrations of various aspects. Many modifications and variations can be made without departing from its spirit and scope, as will be apparent to those skilled in the art.

Figure 3:
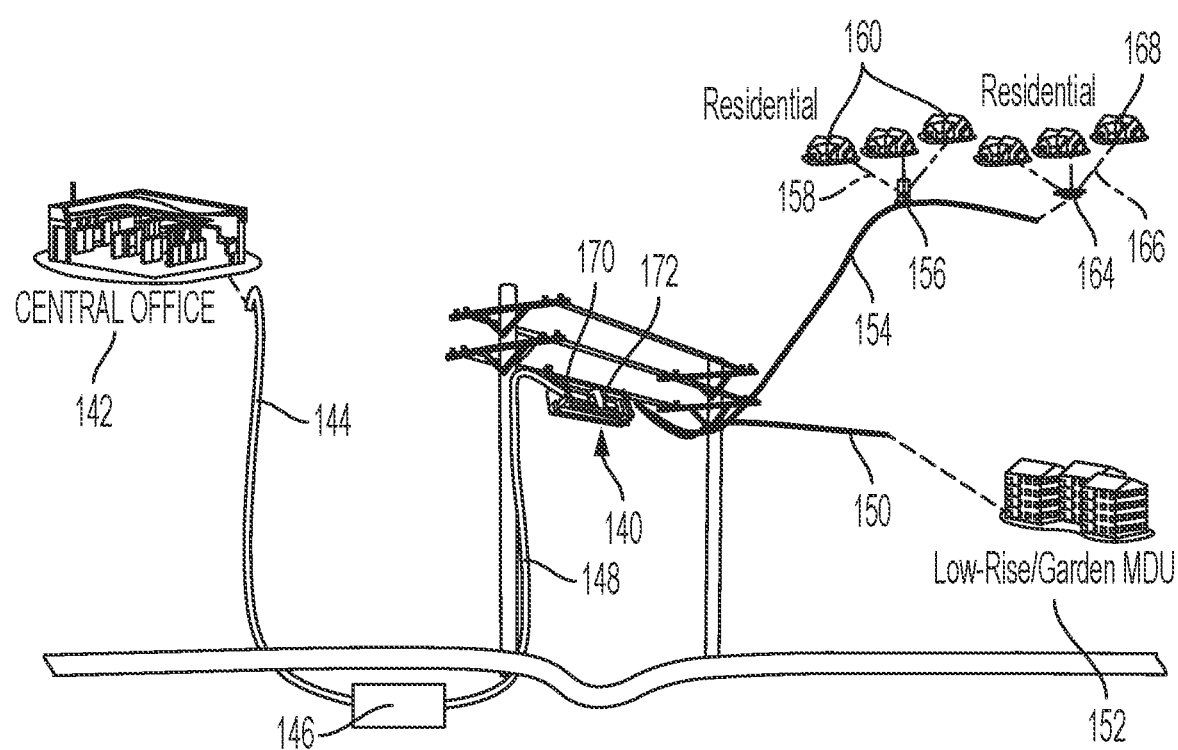
FIG. 3 is a schematic diagram of one embodiment of an aerial strand mounted fiber distribution hub configured according to aspects of the present disclosure.

FIG. 3 is a schematic diagram of one embodiment of an aerial strand mounted fiber distribution hub 140 being used in a fiber distribution network. The optical fiber network includes a central office 142. A feeder cable 144 extends from the central office to a splice enclosure 146. In this embodiment, the splice enclosure 146 is positioned underground and coupled via cable 148 to the aerial fiber distribution hub 140. The fiber distribution hub is mounted aerially, that is strand mounted. A plurality of distribution cables may couple the fiber distribution hub 140 to customer premises. For example, a first distribution cable 150 extends from the fiber distribution hub 140 to MDU 152. Another fiber distribution cable 154 extends from the fiber distribution hub 140 to terminal 156. The terminal 156 provides drop cables 158 to residences 160, and a distribution cable 162 to another terminal 164. The terminal 164 provides drop cables 166 to residences 168.

The fiber distribution hub 140 of the optical fiber network of FIG. 3 includes two fiber distribution units 170 and 172 coupled together, as shown and described further below with reference to FIGS. 5 and 6.

Designed for easy, craft accessibility, various embodiments of fiber distribution hubs may provide an upward hinging, kickstand supported cover with multiple side entrance cable access ports. For example, one embodiment may provide four side entrance cable access ports. Various embodiments may provide different port counts, for example 72, 96, 144 or 288 ports. Various embodiments may provide cross-connect ability. Various embodiments may include splitters.

Figure 4A:
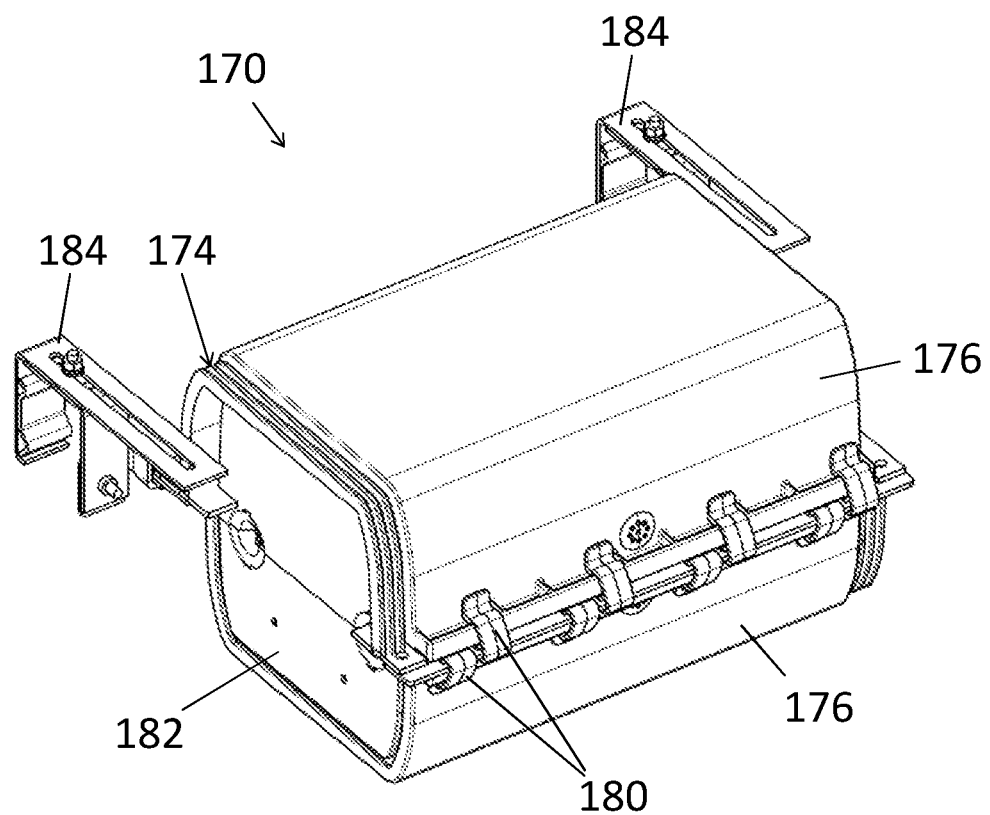
FIG. 4A is a perspective view of one embodiment of an aerial fiber distribution hub configured for strand mounting according to aspects of the present disclosure.
Figure 4B:
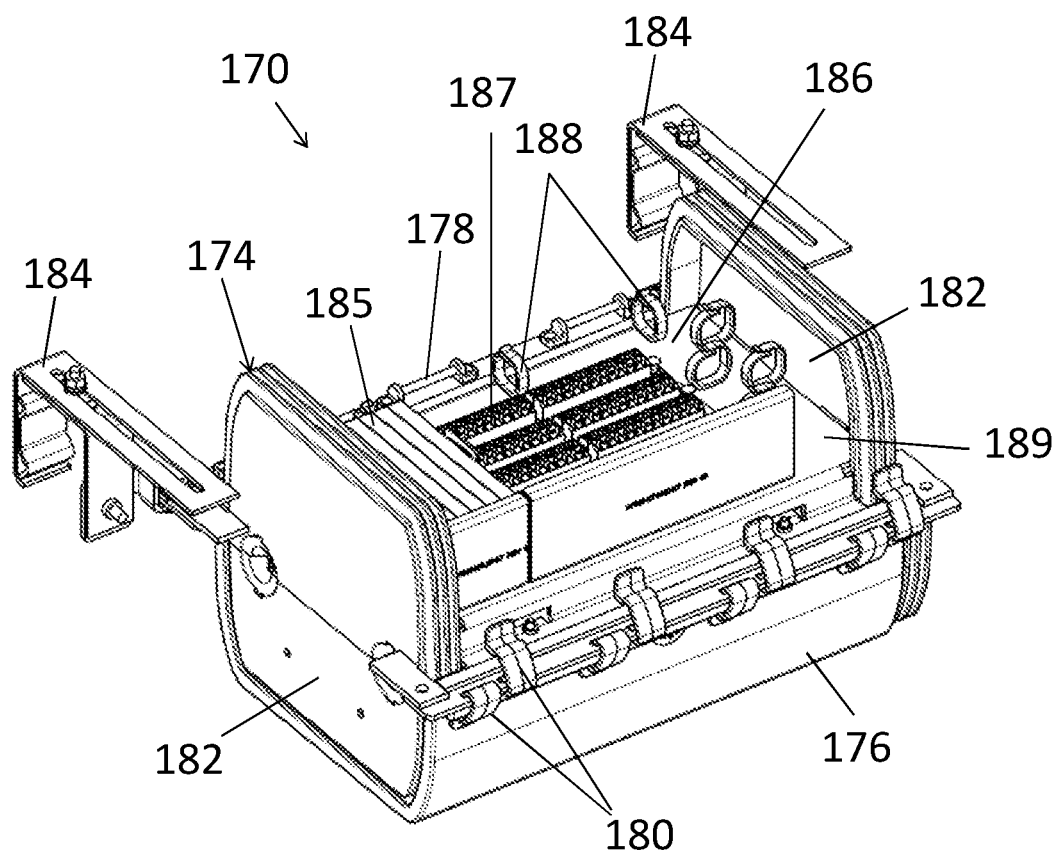
FIG. 4B is a perspective view of the embodiment of FIG. 4A with one cover removed to show the interior configured according to aspects of the present disclosure.

FIGS. 4A and 4B show perspective views of one embodiment of an aerial fiber distribution hub 170 configured for strand mounting. The fiber distribution hub 170 includes a housing 174 and two covers 176 on either side of the hub. FIG. 4A shows the fiber distribution hub 170 with both covers closed, while FIG. 4B shows it with the cover on one side removed to show the interior configuration. The covers 176 may be coupled to the housing 174 by hinges 178 and may be locked by latching locks 180. Embodiments are not limited to hinges and latching locks. In other embodiments, other types of coupling and locking mechanisms may be used. The latches may include bolts or other locks, clips or seals, or other locking mechanisms may be used. In some embodiments, the covers may be removable hinged covers. In some embodiments, one or more covers may be transparent, thereby allowing the interior compartment to be visible while the cover is closed. The housing 174 of the aerial distribution hub 170 includes side panels 182 on opposite sides of the housing. Each side panel 182 may include a plurality of ports, including for example feeder ports and distribution ports.

The aerial fiber distribution hub 170 may also include mounting brackets 184 for mounting the hub to a strand. Embodiments are not limited to the mounting brackets illustrated herein. In other embodiments, other types of mounting structures may be used.

The aerial fiber distribution hub 170 may have at least one compartment 186. The fiber distribution hub 170 may have two compartments 186, located for example at the top and bottom of the hub, each compartment being covered by a respective cover 176, as shown in FIGS. 4A and 4B. The compartments 186 may be separated by a divider 189. The divider 189 may be the base of a compartment, or may be a separate panel disposed between the compartments. The compartment 186 may be configured, for example, to house various optical fiber communication equipment, such as splitters 185. In some embodiments, the compartment may include at least one adapter plate 187. The adapter plate may include a plurality of adapters. The adapters may correspond to distribution ports. The adapter plates may be arranged in a plurality of rows. In one embodiment, a first row comprising a first adapter plate may correspond to the distribution ports on a first side panel of the terminal, and a second row comprising a second adapter plate may correspond to distribution ports on a second side panel of the terminal. The compartment 186 may further include drop management rings 188.

Figure 5A:
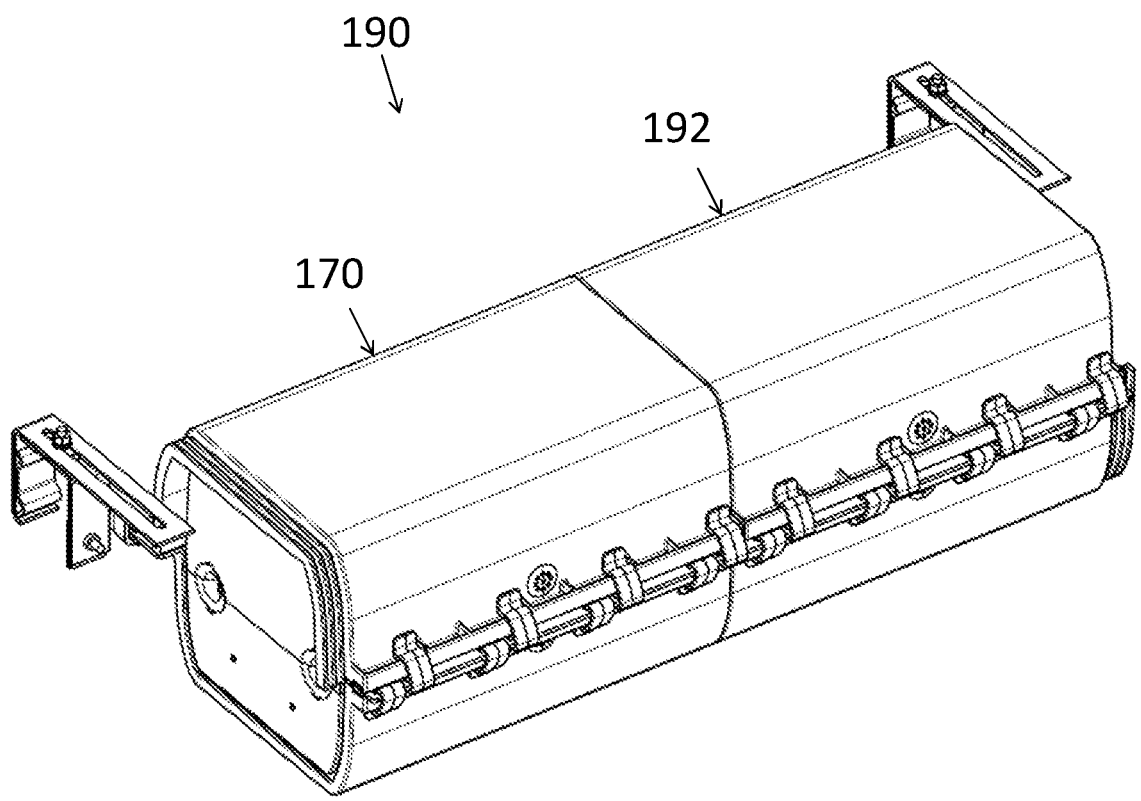
FIG. 5A is a perspective view of one embodiment of an expanded aerial fiber distribution hub with an add-on unit configured for strand mounting according to aspects of the present disclosure.
Figure 5B:
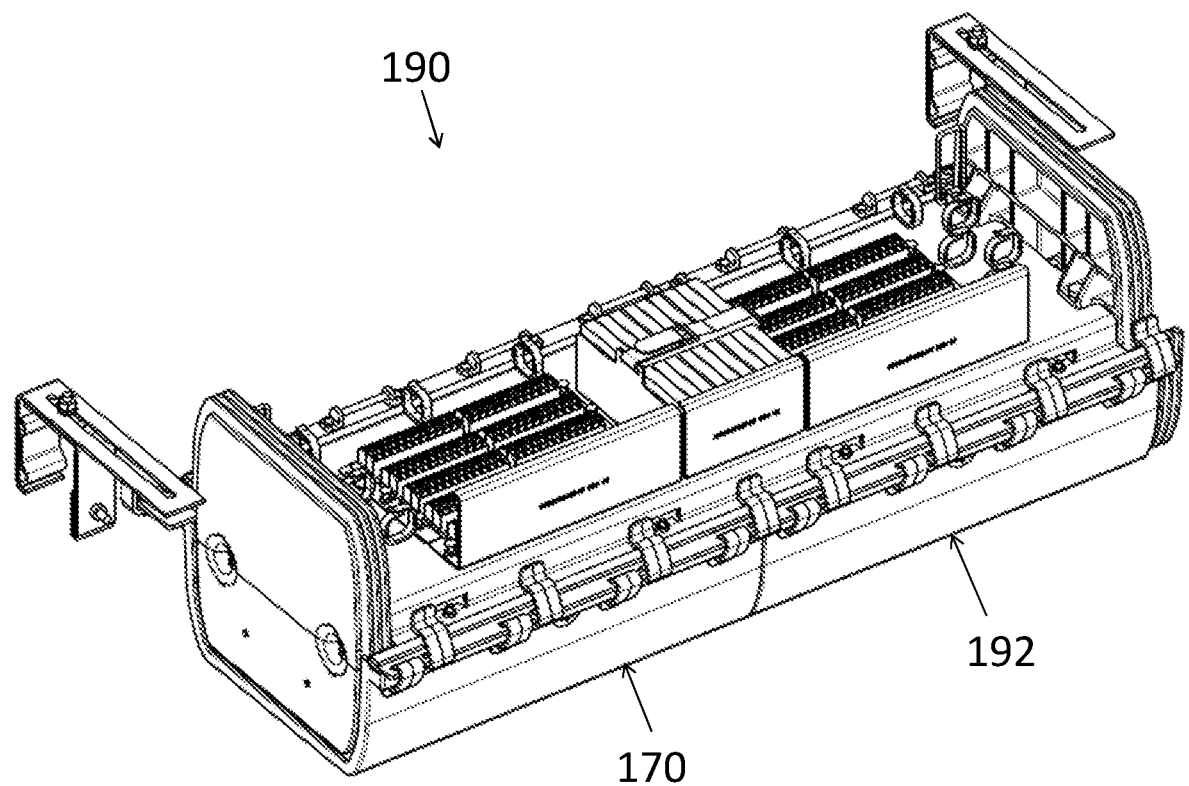
FIG. 5B is a perspective view of the embodiment of FIG. 5A with the covers on one side removed to show the interior configured according to aspects of the present disclosure.

FIGS. 5A and 5B show perspective views of one embodiment of an expanded aerial fiber distribution hub 190, including the main unit 170 shown in FIGS. 4A and 4B coupled to an add-on unit 192. FIG. 5A shows the hub 190 with covers closed, and FIG. 5B shows the hub with the covers removed on one side to show the interior configuration. In some embodiments, one or more covers may be transparent, thereby allowing the interior compartments to be visible while the covers are closed. The aerial distribution hub 190 is configured for strand mounting, as shown and described above in relation to FIGS. 4A and 4B. In this embodiment, the aerial fiber distribution hub 190 includes two units coupled together. Other embodiments may have a different plurality of units coupled together. In this embodiment, the add-on unit 192 is configured to be identical to the main unit 170. The add-on unit 192 may include some or all the features described above with reference to the main unit 170 as shown in FIGS. 4A and 4B. In other embodiments, the add-on units may be configured differently than the main unit of the aerial fiber distribution hub. The units of the fiber distribution hub 190 may be configured to couple and lock together by any mechanism or lock, including but not limited to screws, clips, hooks or other fasteners. In some embodiments, the side panel of the fiber distribution unit, such as a side panel 182 of the hub 170 of FIGS. 4A and 4B may be configured to couple to another fiber distribution hub. In some embodiments, one or more side panels 182 of the fiber distribution hub may be removable, thereby allowing connection of the hub to an add-on unit at the side from which the side panel was removed. The units of the fiber distribution hub 190 may be removable, and each unit may be a standalone fiber distribution hub configured according to aspects of the present disclosure.

Figure 6A:
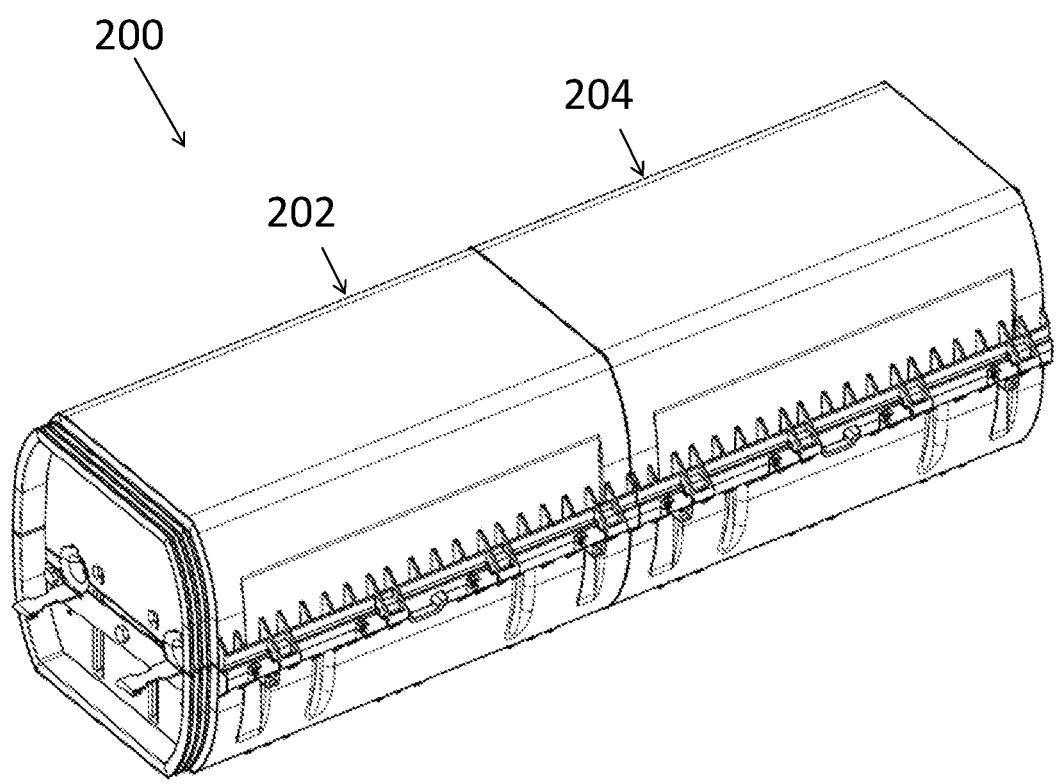
FIG. 6A is a perspective view of another embodiment of an expanded aerial fiber distribution hub with an add-on unit and having molded cable managers according to aspects of the present disclosure.
Figure 6B:
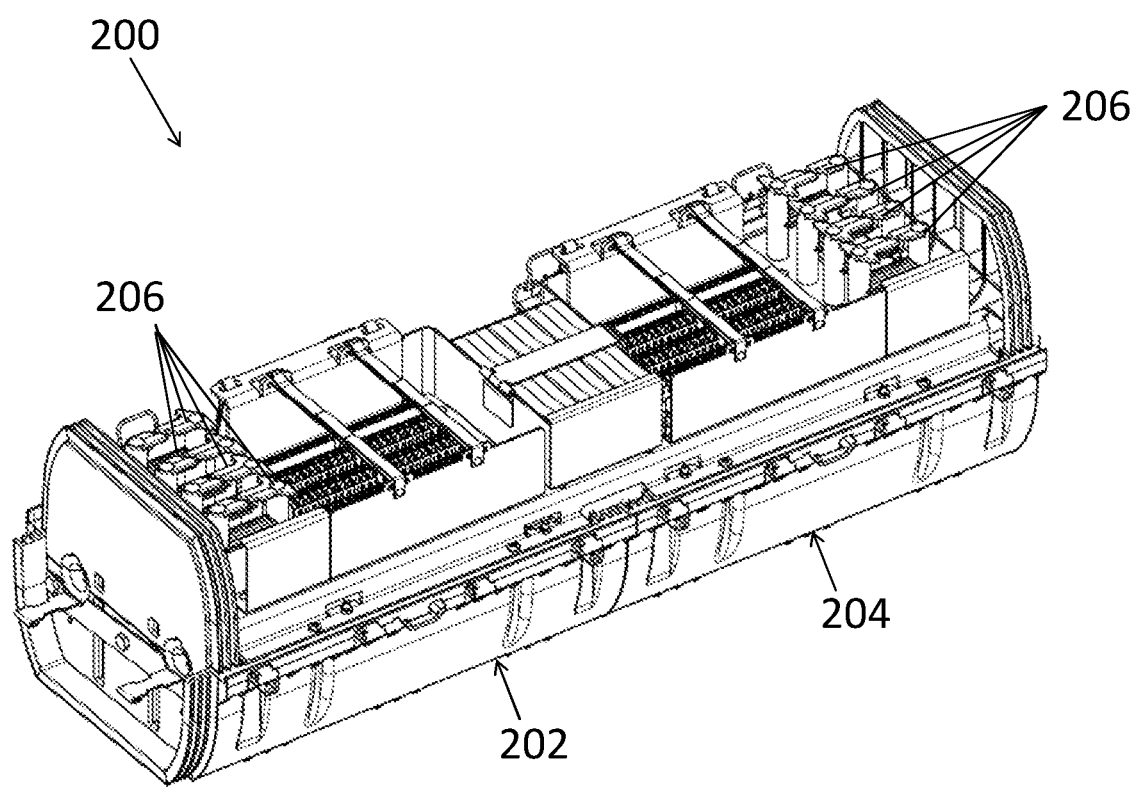
FIG. 6B is a perspective view of the embodiment of FIG. 6A with the covers on one side removed to show the interior configured according to aspects of the present disclosure.

FIGS. 6A and 6B show perspective views of another embodiment of an expanded aerial fiber distribution hub 200 with two units 202 and 204 coupled to each other. FIG. 6A shows the hub 200 with covers closed, and FIG. 6B shows the hub with the covers removed on one side to show the interior configuration. The fiber distribution hub 200 is configured similarly to the fiber distribution hub 190 described above in relation to FIGS. 5A and 5B. In this embodiment, each of the units 202 and 204 of the hub 200 further comprises molded cable managers 206. The molded cable managers 206 may be configured as described below in relation to FIGS. 7 to 9. In this embodiment, the cable managers 206 are arranged along the exterior side panels of each unit of the hub 200. In other embodiments, the cable managers 206 may be arranged in other configurations.

Figure 7:
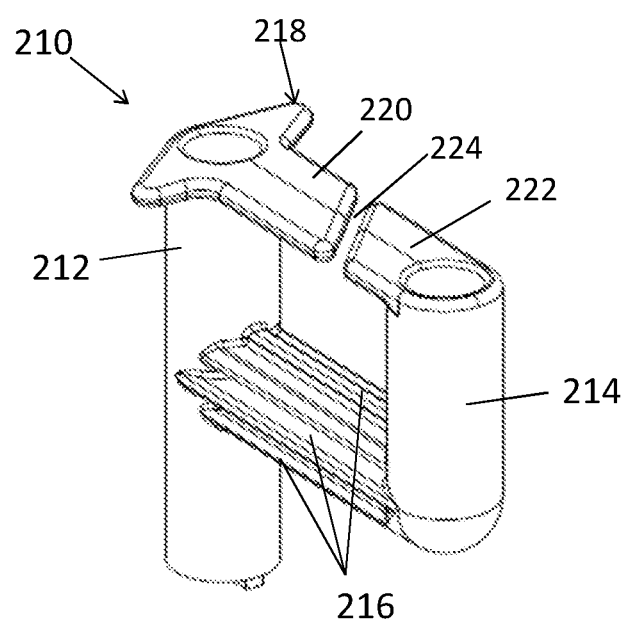
FIG. 7 is a perspective view of one embodiment of a cable manager according to aspects of the present disclosure.
Figure 8:
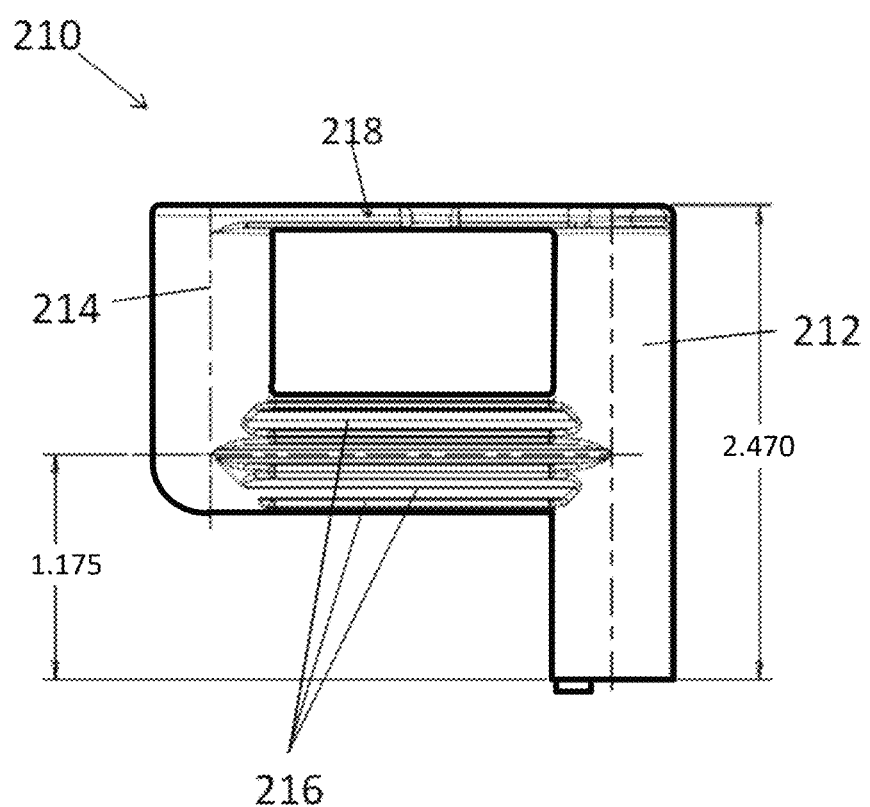
FIG. 8 is a side view of the cable manager of FIG. 7.
Figure 9A:
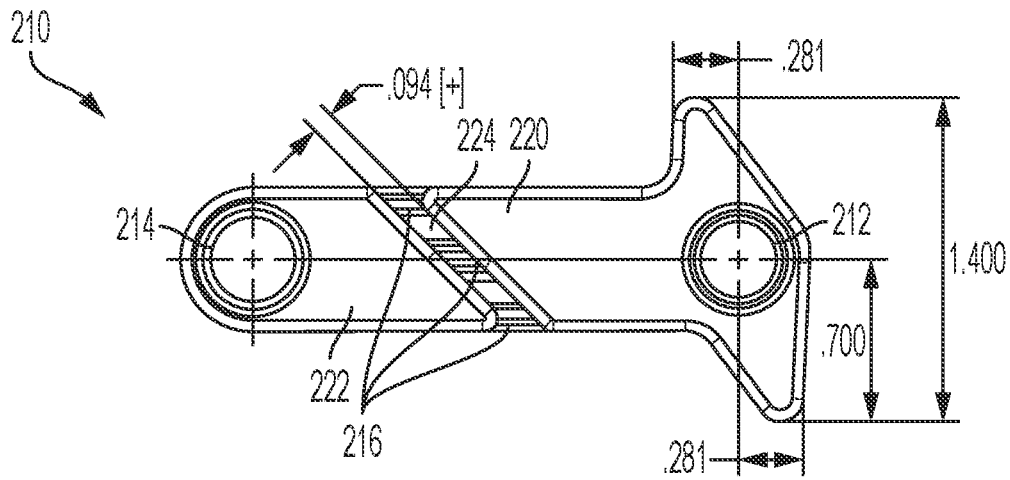
FIG. 9A is a top view of the cable manager of FIG. 7.
Figure 9B:
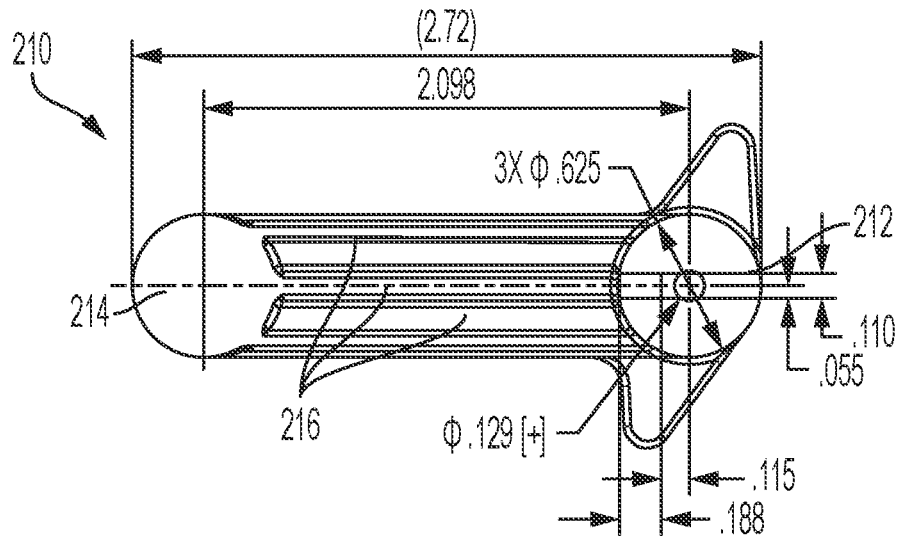
FIG. 9B is a bottom view of the cable manager of FIG. 7.

FIG. 7 is a perspective view of one embodiment of a cable manager 210. FIG. 8 is a side view of the cable manager 210. FIG. 9A is a top view of the cable manager 210, and FIG. 9B is a bottom view of the cable manager 210. Referring to FIGS. 7 to 9, the cable manager 210 comprises a first cylindrical portion 212 and a second cylindrical portion 214. In some embodiments, the cylindrical portions 212 and 214 may have different lengths. The cylindrical portions 212 and 214 may be connected by one or more bridges 216. The bridges 216 may be oriented substantially perpendicular to the direction of the cylindrical portions 212 and 214. The bridges 216 may have slots therebetween. The bridges 216 may extend from a middle portion of the first cylindrical portion 212 to an end of the second cylindrical portion 214, as shown for example in FIG. 7. In other embodiments, the bridges 216 may be configured differently. In some embodiments, the ends of each of the first cylindrical portion 212 and the second cylindrical portion 214 may be connected by a bridge 218. The bridge 218 may have a first portion 220 coupled to the first cylindrical portion 212 and a second portion 222 coupled to the second cylindrical portion 214. There may be a gap 224 between the first portion 220 and the second portion 222, as shown for example in FIG. 7. In other embodiments, the cable manager may be configured differently than the embodiment shown and described in relation to FIGS. 7 to 9.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A fiber distribution hub comprising:
   a first fiber distribution unit;
   a second fiber distribution unit configured to directly couple to the first fiber distribution unit; and
   a mounting structure configured to aerially strand mount the fiber distribution hub.

2. The fiber distribution hub of claim 1, wherein each of the first fiber distribution unit and the second fiber distribution unit comprise a cover and one or more side entrance cable access ports.

3. The fiber distribution hub of claim 2, wherein the cover is upward hinging.

4. The fiber distribution hub of claim 2, wherein the cover is transparent, thereby allowing an interior compartment to be visible when the cover is closed.

5. The fiber distribution hub of claim 1, wherein one or more of the first fiber distribution unit and the second fiber distribution unit comprise a splitter.

6. The fiber distribution hub of claim 1, wherein the first fiber distribution unit and the second fiber distribution unit are configured to couple and lock together by one or more of screws, clips, and hooks.

7. The fiber distribution hub of claim 1, wherein one or more of the first fiber distribution unit and the second fiber distribution unit comprises a side panel configured to couple to an add-on fiber distribution hub.

8. The fiber distribution hub of claim 1, wherein one or more of the first fiber distribution unit and the second fiber distribution unit comprises a removable side panel.

9. The fiber distribution hub of claim 1, wherein one or more of the first fiber distribution unit and the second fiber distribution unit comprises one or more molded cable managers.

10. A fiber distribution hub comprising:
    a first fiber distribution unit;

a second fiber distribution unit configured to directly couple to the first fiber distribution unit; and a mounting structure configured to aerially strand mount the fiber distribution hub;

wherein each of the first fiber distribution unit and the second fiber distribution unit comprise:
 a housing;
 a removable side panel comprising one or more ports; and
 a cover forming an interior compartment.

11. The fiber distribution hub of claim 10, wherein the cover is hinged at one side of the housing and configured to latch at an opposite side of the housing.

12. The fiber distribution hub of claim 10, wherein the mounting structure comprises a plurality of mounting brackets.

13. The fiber distribution hub of claim 10, wherein the one or more ports includes one or more of feeder ports and distribution ports.

14. The fiber distribution hub of claim 10, wherein the interior compartment further comprises an adapter plate configured to receive a plurality of adapters.

15. The fiber distribution hub of claim 10, wherein the interior compartment further comprises a splitter.

16. The fiber distribution hub of claim 10, wherein one or more of the first fiber distribution unit and the second fiber distribution unit are further configured to couple to an add-on fiber distribution hub.

17. The fiber distribution hub of claim 10, wherein the interior compartment comprises a plurality of drop management rings.

18. The fiber distribution hub of claim 10, wherein the interior compartment further comprises a cable manager.

19. The fiber distribution hub of claim 18, wherein the cable manager comprises a first cylindrical portion and a second cylindrical portion having a different length from the first cylindrical portion, wherein the cable manager further comprises a bridge coupling the first and second cylindrical portions.

20. The fiber distribution hub of claim 19, wherein the bridge extends from a middle portion of the first cylindrical portion to an end of the second cylindrical portion.

* * * * *